United States Patent
Sonnamaker et al.

(12) 
(10) Patent No.: US 6,357,986 B1
(45) Date of Patent: Mar. 19, 2002

(54) DEVICE OF MANUAL TRANSPORTING LARGE OBJECTS OR LOADS

(76) Inventors: Evelyn Payton Sonnamaker, 3501 Weiser Dr., Pasadena, TX (US) 77503; Wade Sonnamaker, Jr., 8725 Amanda La., Manvel, TX (US) 77578

( * ) Notice: Subject to any disclaimer, the term of this patent is extended or adjusted under 35 U.S.C. 154(b) by 0 days.

(21) Appl. No.: 09/455,085

(22) Filed: Dec. 6, 1999

(51) Int. Cl.⁷ ................................................ B65G 67/02
(52) U.S. Cl. .................. 414/343; 414/495; 414/498; 414/347; 414/399; 414/400; 414/392; 254/4 C; 254/279; 187/240
(58) Field of Search ................................. 414/400, 529, 414/345, 382, 498, 347, 399, 343, 745.4, 745.5, 460, 468, 495; 254/4 R, 4 C, 279; 294/81.55; 187/213, 240, 210

(56) References Cited

U.S. PATENT DOCUMENTS

| | | | | |
|---|---|---|---|---|
| 585,231 A | * | 6/1897 | Schaffer | 414/529 |
| 2,127,972 A | * | 8/1938 | Hutchinson et al. | 414/343 X |
| 2,813,744 A | * | 11/1957 | Hutchinson | 294/81.55 |
| 3,139,266 A | * | 6/1964 | Tew | 187/213 X |
| 3,391,905 A | * | 7/1968 | Burns | 414/460 X |
| 3,414,087 A | * | 12/1968 | Schmiesing | 414/458 X |
| 4,147,267 A | * | 4/1979 | Mai | 414/498 |
| 4,188,168 A | * | 2/1980 | Brown et al. | 294/81.55 |
| 4,313,708 A | * | 2/1982 | Tiliakos | 414/498 |
| 5,490,753 A | * | 2/1996 | Green | 414/498 |
| 5,988,597 A | * | 11/1999 | Egan | 414/460 X |

* cited by examiner

Primary Examiner—Frank E. Werner (57) ABSTRACT

The device of manual transporting large objects or loads, which includes a wheeled, load supporting frame vertically adjustable, facilitates the manual load, unload, and transport of large objects or loads, such as pickup truck toppers or shells, sheet material, pipes, other building supplies, appliances, etc. Frame height adjustment to the level of on or off load is by means of telescoping legs, supported on lockable wheels or castors, or in combination with hand winches mounted on the legs. Rollers may be attached to the top of the frame for ease in sliding objects or loads on or off. In an alternate embodiment for elongated objects or loads, such as pipes, beams, rails, etc., a beam and additional supports are added to the frame. The device is positioned over the load. The load, such as a pipe, is attached to each end of the beam by chains and transported to an interim workstation or its final disposition.

3 Claims, 9 Drawing Sheets

DEVICE OF MANUAL TRANSPORTING LARGE OBJECTS OR LOADS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of Invention

This invention relates to dollies, carriers, land vehicles, mobile racks, etc. for use in manually loading, transporting, and unloading objects presenting bulk, weight, size, and/or other constraints, such as pickup truck toppers or shells, building material, elongated members, etc.

2. Description of Prior Art

This invention addresses needs and problems associated with manually loading and/or unloading and transporting items or objects that are large and bulky, such as, pickup truck toppers or shells, sheets of building material, pipe, etc., by person(s) at home or job site.

Owners of pickup trucks with toppers or camper shells must remove them to use their pickup truck beds for loads not convenient or possible with the toppers or shells on, or arrange to handle the loads another way, thereby forfeiting the versatility of their pickup trucks. To remove a conventional topper or shell from atop a pickup truck bed, two or more persons both lift and slide it off the truck and carry it to a place for interim storage. When ready to reinstall it, the reverse is done. Some problems associated with this are: finding and scheduling, both for removal and for reinstallation, two or more persons able to lift and carry, possible physical strain or injury to persons lifting and carrying, possible damage to shell or truck if dropped, and inconvenient storage. These problems exist not only for owners but for those selling, repairing, and/or modifying pickup truck toppers or shells. Prior art recognizes the need to remove toppers and offers alterations to the toppers or shells, such as, added wheels and/or legs, and slide mounts to assist in removal. Also in an attempt to avoid removal for certain loads, some additions provide for raising the toppers to some portion or degree.

At home or job site, unloading pickup trucks or other like vehicles, loaded with sheets of building material, lumber, bags of concrete mix, pipe, etc., also involves lifting and setting down on a dolly type vehicle, if available, or else carrying by hand to storage or work site. The process is repeated until the vehicle is unloaded. If the storage is interim, the material must be moved or handled again to take to the work site.

At construction sites, material, such as pipe, must be moved to fabrication work areas. Often pipe is carried by hand. One method involves multiple persons lifting pipe onto a two wheeled carrier in a manner that the weight of the pipe will be balanced. Then one person bends over to grasp the handles of the carrier, balances the heavy load, and maintains load balance while pushing the carrier to the fabrication area. The persons loading or person pushing the vehicle can experience physical back strain and damage, which can result in loss of livelihood.

Whether at home, job site, construction site, wholesaler, retailer, or elsewhere, problems associated with manually lifting and transporting objects or articles presenting bulk, weight, size, and/or other constraints are common. Problems identified are:

(1) possible physical strain or injury to persons lifting and carrying, which may result in loss to the persons, including livelihood, but also loss to employers and contractors in experience and resources to complete a job on time plus loss to those expecting the job to be done at a certain time.

(2) possible damage to material if dropped while hand carried or ported on inadequate vehicle.

(3) interim storage not available on the transporting device requiring additional lifting and carrying from storage to work area, repeating to work areas, to final installation or use.

(4) more resources required in personnel or time or both resulting in increased costs.

(5) equipment not available or feasible at the destination site for unloading and transfer, such as home, field, job site, or construction site requiring more manual handling.

It is therefore highly desirable to provide a device of manual transporting large objects and loads:

(a) which provides means for supporting a variety of load configurations (pipe, lumber, paneling, sheet material, equipment, pickup truck topper or camper shell, etc.) at a selected height relative to a horizontal plane, with locking capabilities, and easily movable with or without a load in place.

(b) which provides an alternative means especially for supporting elongated members loads, such as pipes, beams, rails, and the like.

(c) which provides a stable platform of strong construction material supporting the weight of the load configurations safely.

(d) which provides means to reduce possible physical strain and injury to material handlers with subsequent losses to selves, employers, contractors, and the like.

(e) which provides means of efficiencies in loading and offloading load configurations to reduce the number of personnel and/or time required.

(f) which is readily movable and maneuverable by an individual person.

(g) which provides means of interim storage or workstation.

(h) which provides easy installation and knockdown.

(i) which provides means simplifying functioning parts and using readily available materials at a reasonable cost to manufacture.

BRIEF SUMMARY OF THE INVENTION

Therefore the objects and advantages of the present invention to provide a device of manual transporting large objects and loads are:

(a) to provide means for supporting a variety of load configurations (pipe, lumber, paneling, sheet material, equipment, pickup truck topper or camper shell, etc.) at a selected height relative to a horizontal plane, with locking capabilities, and easily movable with or without a load in place.

(b) to provide an alternative means especially for supporting elongated members loads, such as pipes, beams, rails, and the like.

(c) to provide a stable platform of strong construction material supporting the weight of the load configurations safely.

(d) to provide means to reduce possible physical strain and injury to material handlers with subsequent losses to selves, employers, contractors, and the like.

(e) to provide means of efficiencies in loading and off-loading load configurations to reduce the number of personnel and/or time required.

(f) to provide means readily movable and maneuverable by an individual person.

(g) to provide means of interim storage or workstation.

(h) to provide easy installation and knockdown.

(i) to provide means simplifying functioning parts and using readily available materials at a reasonable cost to manufacture.

These objectives and advantages are obtained by the present invention of the device of manual transporting large objects and loads. To attain these, the present invention is comprised of a platform having a base frame of a pair of longitudinal side members, a pair of transverse end members, and a plurality of crossbars, joined to side members parallel to end members. The frame has a plurality of rollers attached to the top of it on end members and crossbars. The frame is joined and supported on a plurality of vertically telescoping, lockable, wheeled legs having hand winches attached.

In the alternative means especially for supporting elongated member loads, the device of the present invention is configured for suspending the load under the frame instead of on it. Rollers are omitted from the frame to which a longitudinal beam and a plurality of beam supports are added. An added mechanism operates all of the hand winches from any one winch. A load is secured to the device by positioning it over the load, placing chains under each end of the load, and hooking the ends of the chains to the sliding chain brackets at each end of the beam.

These and other objects and advantages will become apparent from a consideration of the ensuing description and drawings.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE SEVERAL VIEWS OF THE DRAWING

This invention of a device of manual transporting large objects or loads will be better understood, and objects other than those set forth above will become apparent, when consideration is given to the following detailed description thereof. Such description makes reference to the annexed drawings wherein:

In FIG. 1A, a pickup truck topper on a pickup truck is being slid on or off the device as assembled in FIG. 2. The device can also be lowered to the bottom of a pickup truck bed and used to move material in the same manner as shown in FIG. 1B. In FIG. 1B, material is being slid from a pickup truck bed onto the device as assembled in FIG. 5, which device also can be lowered to ground or floor level.

FIG. 1A illustrates a use of this embodiment, which may also be used to move material at the level shown in FIG. 1B.

FIG. 1B illustrates a use of this embodiment.

REFERENCE NUMERALS IN DRAWINGS 10 device
11 device
12 modified device
14 base frame
16 telescoping leg
18 telescoping leg
20 wheels or castors
24 hand winch
24a winch handle
24b winch cable 24c winch cable eye
24d winch extended drive shaft
28 longitudinal side member
30 transverse end member
32 crossbar
34 aperture
36a bolt
36b nut
36c washer
36d bolt
38 frame mounts
42 rollers
42a roller
42b roller bracket
44 aperture
46a bolt
46b nut
50 angle clip
56 hollow tube
60 aperture
62 locking pin
64 telescoping tube
66 aperture
68 set screws
70 caster mount
76 winch mount
78a bolt
78b nut
80 cable mount
82a bolt
82b nut
84 frame
86 transverse end member
88 crossbar
90 beam
92 beam support
94 sliding chain bracket
98a beam mount
98b beam mount
100a beam support mount
100b beam support mount
104 chains
114 shaft
116a shaft coupling
116b shaft coupling
118 chain sprocket
120 chain
160 pickup truck bed
164 pickup truck topper
168 material
172 pipe

DETAILED DESCRIPTION OF THE INVENTION

Before the present device of manual transporting large objects or loads is disclosed and described, it is to be understood that this invention is not limited to the particular configurations, process steps, and materials disclosed herein, as such process steps and materials may vary somewhat. It is also to be understood that the terminology employed herein is used for the purpose of describing particular embodiments only and is not intended to be limiting since the scope of the present invention will be limited only by the appended claims and equivalents thereof.

FIGS. 1A, 1B–4—Preferred Embodiment

Figure 1A:
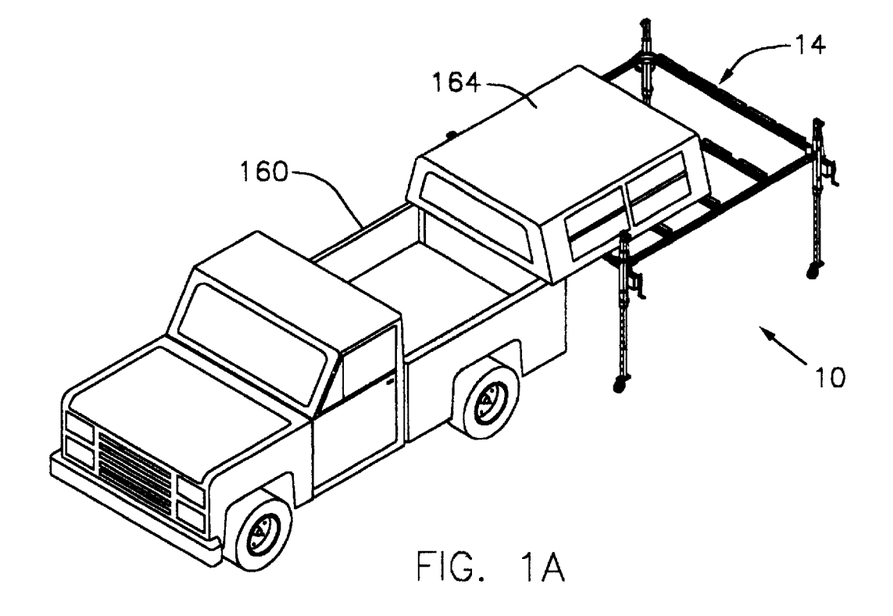
FIGS. 1A and 1B are perspective views of the invention being used in relation to a pickup truck to load or unload different objects at different levels.
Figure 1B:
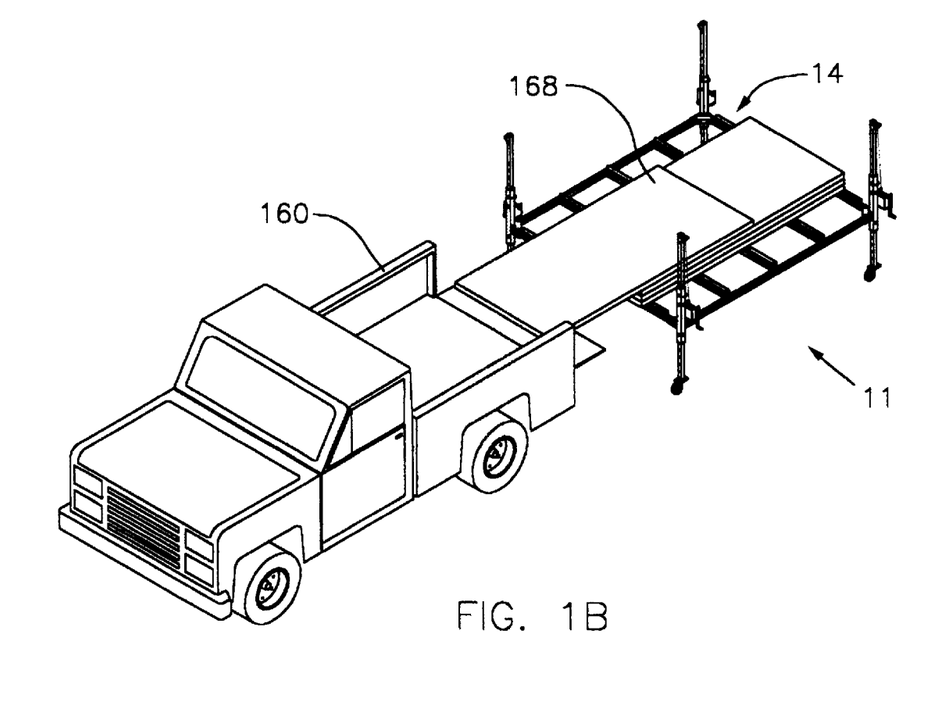

FIGS. 1A and 1B illustrate the range of levels and two general uses of the device of manual transporting large objects or loads 10 in the preferred embodiment and 11 in the additional embodiment of inverted or cart position.

Figure 2:
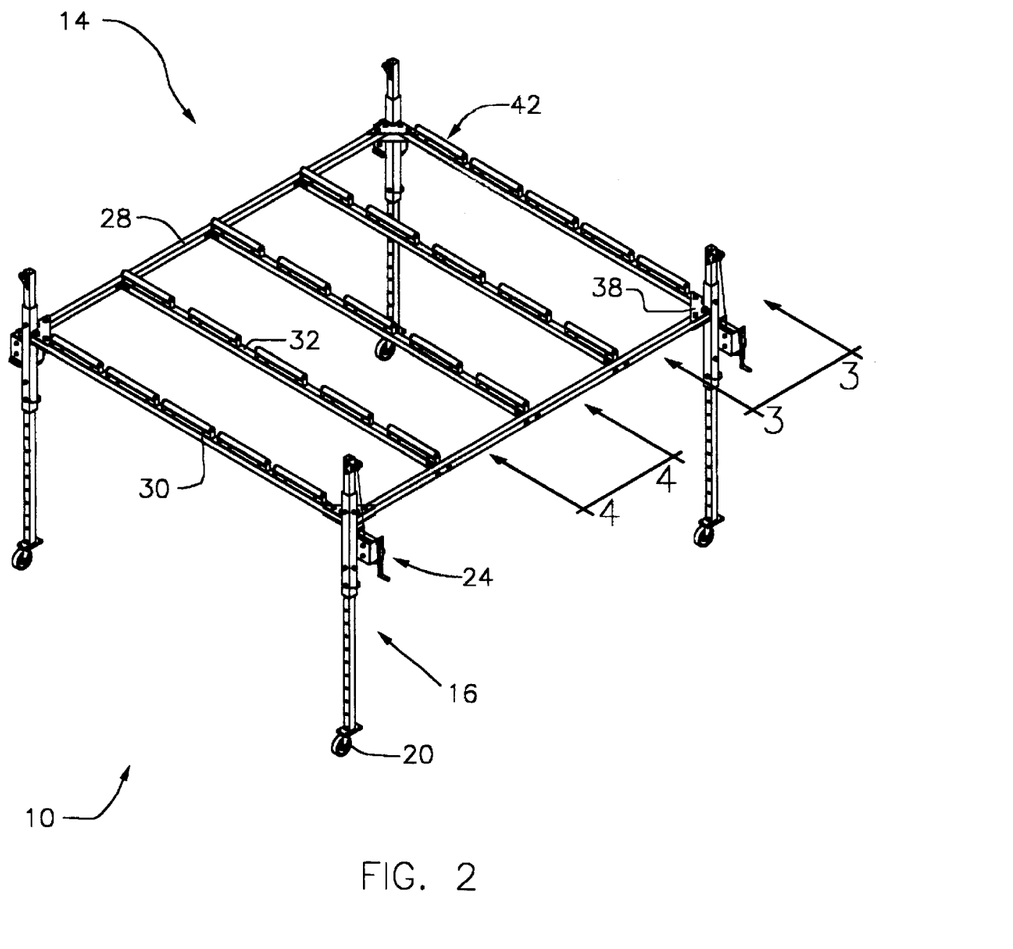
FIG. 2 is a perspective view of a representative structure embodying the features of the invention comprising a base frame of elongated longitudinal side and transverse end members with crossbars, rollers, telescoping legs with locking wheels or castors, and hand winches for raising and lowering the load bearing frame.

In one use, FIG. 1A shows base frame 14 of device 10, as assembled in FIG. 2, raised even with the top sides of a pickup truck bed 160 with a pickup truck topper 164 being removed to or replaced from device 10 by sliding at the same height. Though not shown, this embodiment can also be lowered to the bottom of pickup truck bed 160 for moving objects from or to that level as shown in FIG. 1B.

Figure 5:
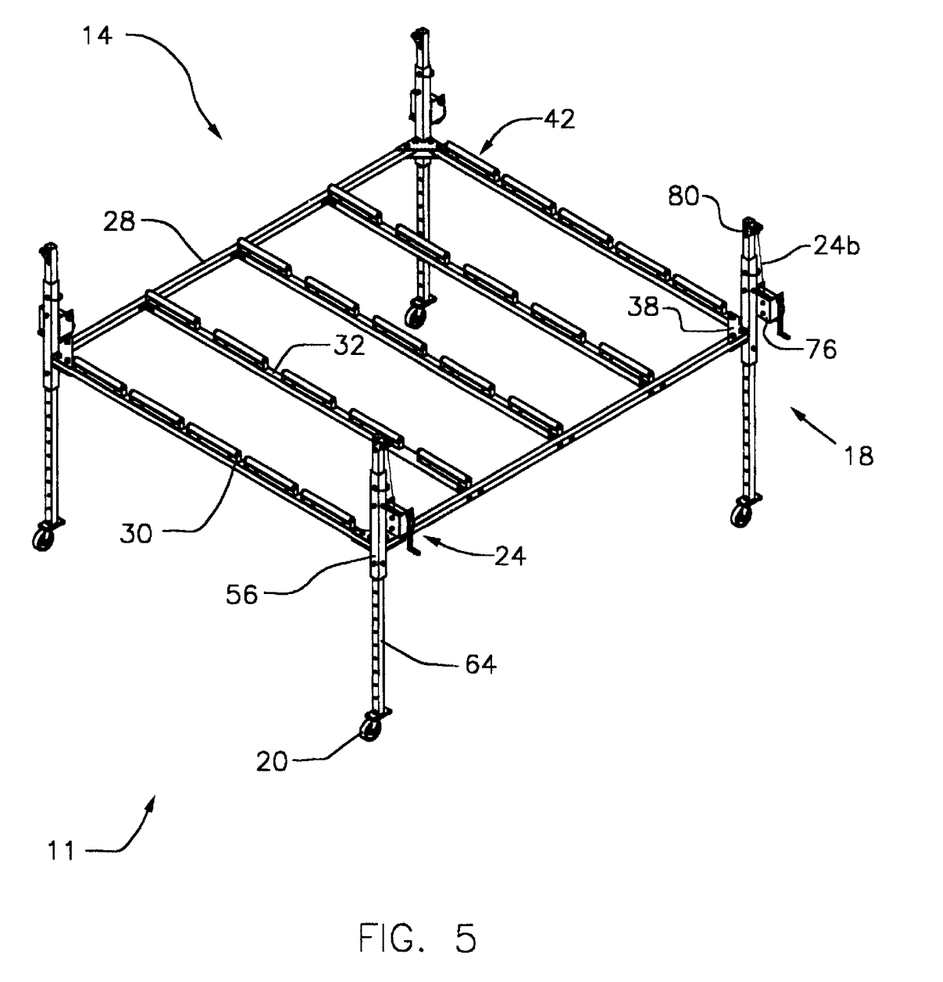
FIG. 5 is a perspective view of an additional embodiment of the present invention in an inverted or cart position for positioning the frame to near ground or floor level with upward height adjustment. This facilitates unloading from an upper level, such as a pickup truck bed, to ground or floor level or vice versa.

In another use, FIG. 1B shows base frame 14 of device 11, as assembled in FIG. 5, raised to the level of the bottom of a pickup truck bed 160 to facilitate loading or unloading and transport of material 168, such as plywood, drywall, insulation, etc. In this embodiment, base frame 14 can be lowered to ground or floor level.

Figure 3:
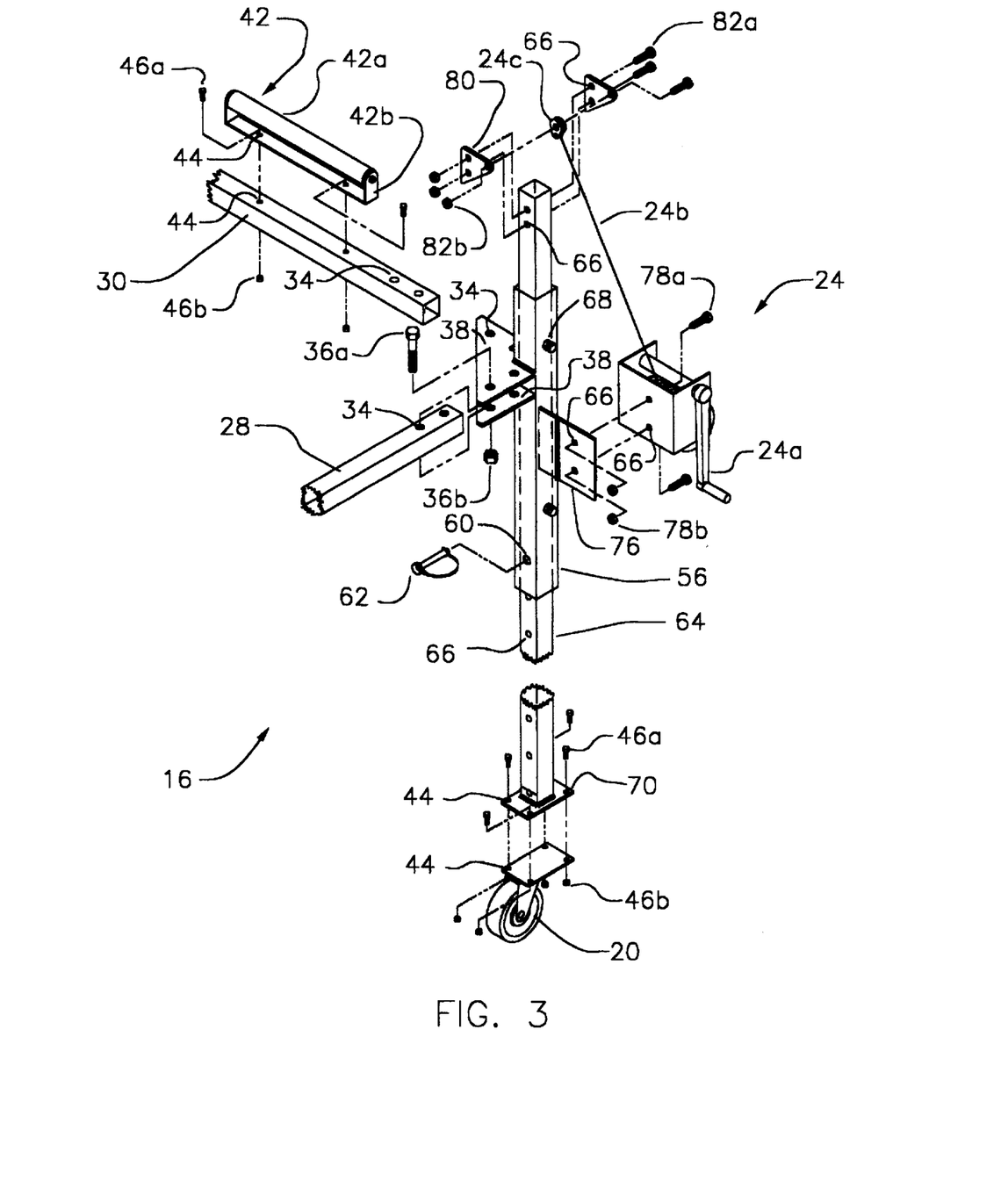
FIG. 3 is an enlarged and exploded sectional view of one of the corner assemblies, taken substantially on line 3—3 in FIG. 2 with its component parts, including its leg, winch, and roller assemblies.

FIG. 2 illustrates a preferred embodiment of the present invention of the device of manual transporting large objects or loads 10. The device 10 comprises a frame 14 supported on a plurality of telescoping legs 16 mounted on locking wheels or castors 20 and having hand winches 24 attached. Frame 14 is comprised of rigid material, such as square tubing, in the form of two longitudinal side members 28, two transverse end members 30, and a plurality of crossbars 32. Frame 14 is joined at right angles of its side members 28 and end members 30 by inserting their ends and aligning apertures 34 in frame mounts 38 attached to telescoping legs 16 as shown in FIG. 3. Side and end members 28, 30 are secured to frame mounts 38 using bolts 36a and nuts 36b.

Figure 4:
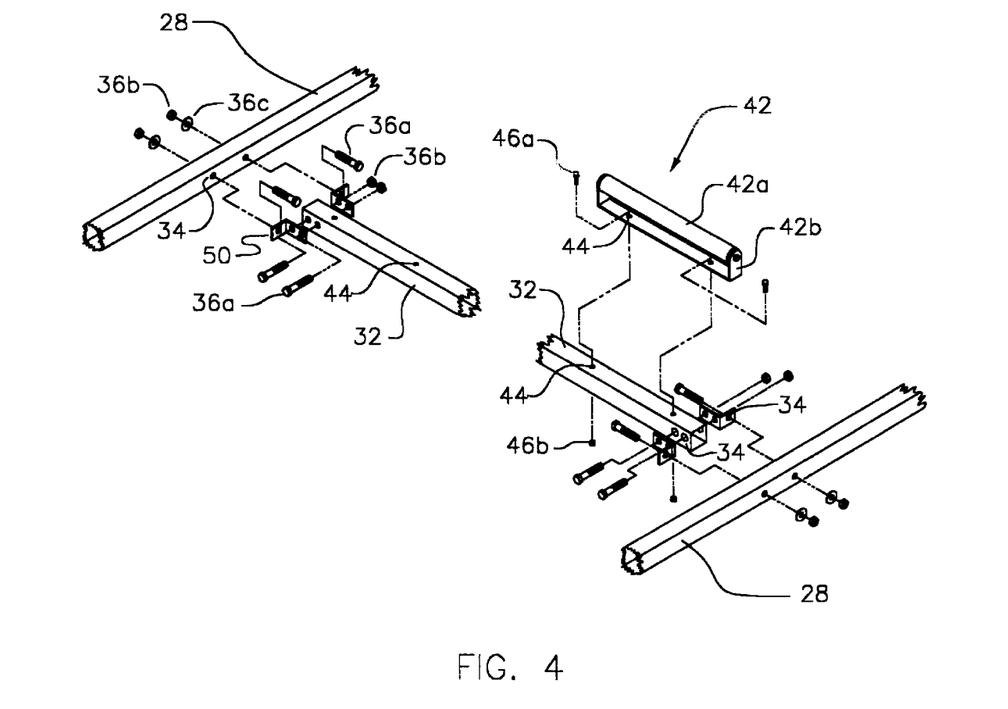
FIG. 4 is an enlarged and exploded sectional view of a crossbar assembly, including roller attachment, taken substantially on line 4—4 in FIG. 2.

Crossbars 32 are spaced apart parallel with end members 30 and attached at each end to side members 28 using a pair of angle clips 50 with apertures 34 as shown in FIG. 4. A pair of angle clips 50 are first matched to apertures 34 at each end of crossbar 32 and secured together with bolts 36a and nuts 36b. Then crossbar 32 is attached to side members 28 by matching apertures 34 in clips 50 and side members 28 and securing with bolts 36a, washers 36c, and nuts 36b. Crossbars 32 are provided for stability, a base for varying size loads, and support for rollers 42. This embodiment does not fix the number of crossbars 32, if any, nor the direction of placement, whether parallel with side members 28 or end members 30 or other combination. Additionally, other material, such as plywood, could be laid across frame 14 to form a solid base, shelf, etc. with or without crossbars.

In this preferred embodiment, frame 14 is shown as comprised of fixed length, rigid material for strength and stable load support. Those skilled in the art will recognize frame 14 components, side and end members 28, 30 and crossbars 32, may be modified to allow adjustment of lengths, using methods, such as telescoping.

Rollers 42 are attached spaced apart along the top of frame 14 to end members 30 and crossbars 32 for ease of sliding loads onto or off of device 10. Rollers 42 are preferred, but optional. This embodiment does not fix the number, if any, nor the type of rollers used. Referring to FIGS. 3 and 4, rollers 42 comprise a roller 42a in a roller bracket 42b with apertures 44 for attachment. The roller brackets 42b are attached to end members 30 and crossbars 32 by matching apertures 44 and securing with bolts 46a and nuts 46b.

Now referring to FIGS. 2 and 3, frame 14 is supported on a telescoping leg 16 at each corner. Leg 16 is composed of a hollow tube 56, defining near its bottom end, an opposed pair of apertures 60 therethrough to accommodate locking pin 62. Slidably received in hollow tube 56 is a hollow telescoping tube 64 having other opposed pairs of apertures 66 to accommodate locking pin 62. A plurality of set screws 68 on hollow tube 56 may be adjusted to allow minimum clearance between hollow tube 56 and telescoping tube 64. The opposed pair of apertures 60 in hollow tube 56 may be aligned with any opposed pair of apertures 66 in telescoping tube 64. Locking pin 62 may be inserted through the aligned apertures 60, 66 to fix telescoping tube 64 vertically with respect to hollow tube 56 in one of several possible positions. Alternatively, when height adjustment of leg 16 is maintained using hand winch 24 without regard to alignment of apertures 60, 66, locking pin 62 may be inserted as a safety stop through the first available apertures 66 in telescoping tube 64 appearing below hollow leg 56.

For attaching typical locking caster 20 (locking mechanism not shown), caster mount 70 with apertures 44 is welded, or otherwise attached, to the bottom end of telescoping tube 64. Locking caster 20 with matching apertures 44 is secured to caster mount 70 using bolts 46a and nuts 46b thereby providing movement with swivel positioning and locking capability. In this embodiment, casters 20 are shown, but other types of wheels, such as all terrain, could be used.

As previously described, frame 14's side and end members 28, 30 are joined together and supported on frame mounts 38, comprised of two triangular plates, each having apertures 34 and a section cutout at its right angle for fitting to a corner of hollow tube 56. Frame mounts 38 are welded to hollow tube 56 near its top end, spaced apart in a manner for the insertion of the ends of side and end members 28, 30 to butt against the vertical sides of the corner of hollow tube 56. Side and end members 28, 30, when inserted and aligned with apertures 34, are fixed to frame mounts 38 using bolts 36a and nuts 36b.

Those skilled in the art will recognize frame mounts 38 could be attached by other means than welding which is chosen for strength and endurance in this embodiment. Likewise, the frame mounts 38 themselves, though designed for strength and ease of assembly, might be modified without departing from the spirit and intent of this present invention.

A typical hand winch 24 is attached to a winch mount 76 which is welded, or otherwise attached, to hollow tube 56 on telescoping leg 16. Winch mount 76 is mounted on hollow tube 56 such that winch 24 will be attached with its winch handle 24a to the outside of side members 28, thereby not interfering with loading and unloading to/from end members 30. FIG. 3 shows hand winch 24 is secured to winch mount 76 by matching apertures 66 and using bolts 78a and nuts 78b.

The end of winch cable 24b, as extended from winch 24, is attached to the top of telescoping tube 64 using a pair of cable mounts 80. Each cable mount 80 is comprised of a triangle shaped plate with apertures 66. Cable mounts 80 are attached by aligning each with apertures 66 on opposite sides at the top of telescoping tube 64, threading bolts 82a through all, and fastening with nuts 82b. Then winch cable 24b is attached by threading bolt 82a through the remaining aperture 66 in the first cable mount 80, the winch cable eye 24c at the end of winch cable 24b, the remaining aperture 66 in the second cable mount 80, and tightening with nut 82b.

The illustration of a hand winch 24 for each telescoping leg 16 does not fix the number of winches 24 in this present invention. Device 10 may have none or other configurations, such as provided in the alternative embodiment shown in FIGS. 6–9 whereby all winches can be operated from any single winch.

FIGS. 1B, 5—Additional Embodiment

FIG. 5 shows an additional and important feature of the present invention in which device 10 has been reassembled in an inverted or cart position as device 11 wherein frame 14 is positioned low to ground or floor level with upward telescoping range as shown in FIG. 1B. The higher range as in FIG. 1A and lower range as in FIG. 1B are accomplished according to the assembly of hollow tube 56, having frame mounts 38 welded at its upper end, on telescoping tube 64. In FIGS. 1A, 2, and 3, hollow tube 56 is assembled in its upright position with frame mounts 38 closer to the top of tube 64. In FIGS. 1B and 5, hollow tube 56 is assembled in reverse with frame mounts 38 closer to the bottom of telescoping tube 64 just above casters 20. This latter assembly facilitates one person loading or unloading and transport of a heavy item, such as a washing machine.

In FIG. 5, device 11 is the same as device 10 in FIG. 2 and telescoping leg 18 is the same as telescoping leg 16 in FIG. 3 except hollow tube 56 is assembled in reverse position as shown.

This additional embodiment requires no modification to the preferred embodiment in FIG. 2 but some disassembly and appropriate re-assembly. The order of disassembly might be to remove from each telescoping leg 16: 1) cable mounts 80 with winch cable 24b from telescoping tube 64, 2) hand winch 24 from winch mount 76, and 3) telescoping tube 64 from hollow tube 56. Turn or flip frame 14, still mounted on hollow tubes 56, over 180 degrees, or else disassemble frame 14 from hollow tubes 56 and reassemble with hollow tubes 56 reversed. The latter may be preferable if rollers 42 are on frame 14. Reassemble to the appropriate positions. For some, this embodiment may be the preferred embodiment. Either embodiment is quickly achieved through easy knockdown and re-assembly.

FIGS. 6–9—Alternative Embodiment

Figure 6:
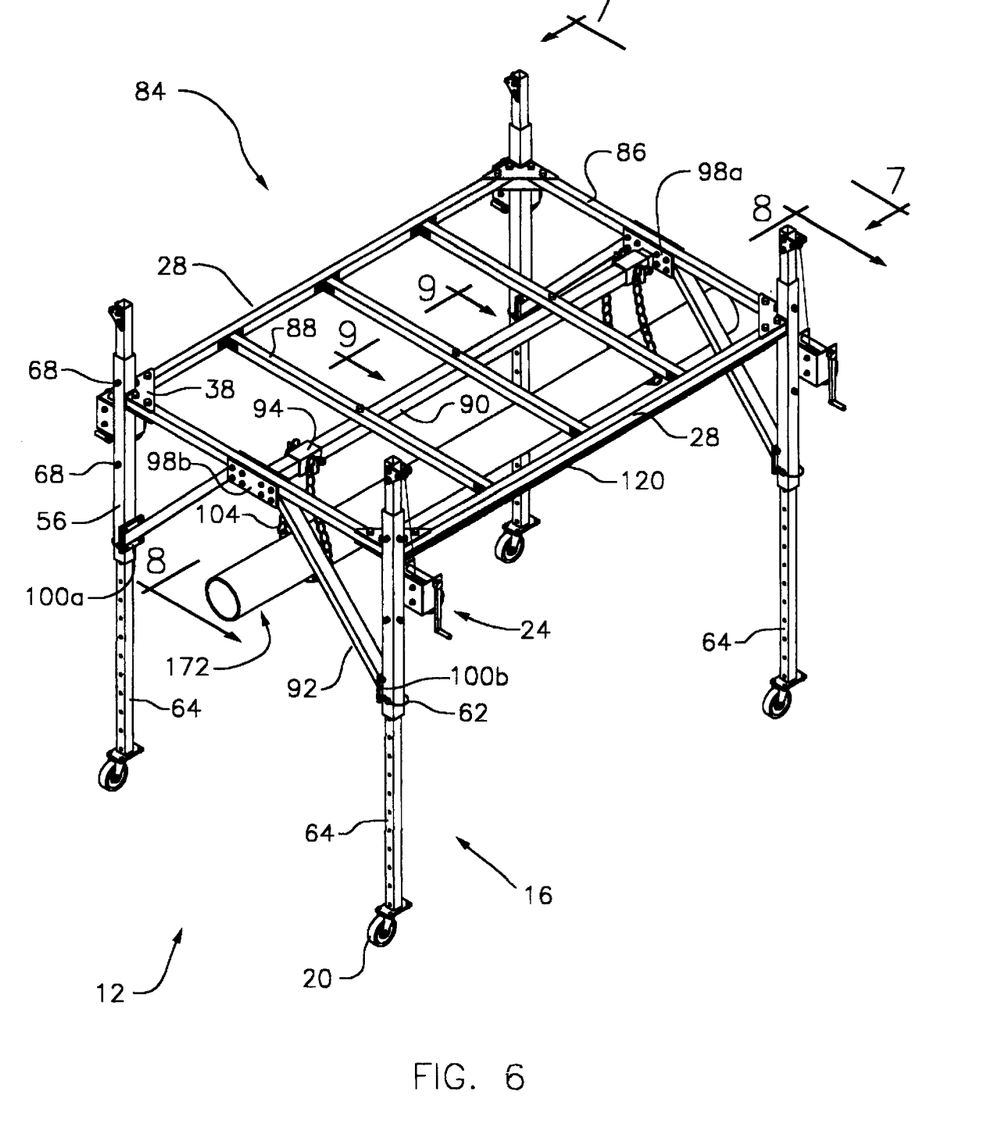
FIG. 6 is a perspective view of an alternative embodiment of the present invention especially for moving elongated members or loads. The device is illustrated showing a section of a pipe loaded for transport. The device is the same as shown in FIG. 2 but without rollers and with added beam and bracing supports for moving elongated member loads suspended under the frame. The embodiment also includes a mechanism illustrated in FIGS. 7 and 8 for operating all winches from any one winch.

In combination with what has previously been described, FIG. 6 illustrates an alternative embodiment of the present invention especially for moving elongated member loads, such as pipes, rails, beams, and the like. In this embodiment, modified device 12 is positioned over that to be loaded. Then the load is attached to and suspended from frame 84 of device 12. FIG. 6 shows a section of pipe 172 loaded and suspended for transfer. The structure of device 10 and modified device 12 are the same except support members for suspending a load are added. Also added is a mechanism for operating all hand winches 24 from any single winch 24, which mechanism can also be incorporated on device 10. Chain 120 in FIG. 6 illustrates part of the mechanism, which is shown in detail in FIGS. 7 and 8.

Figure 7:
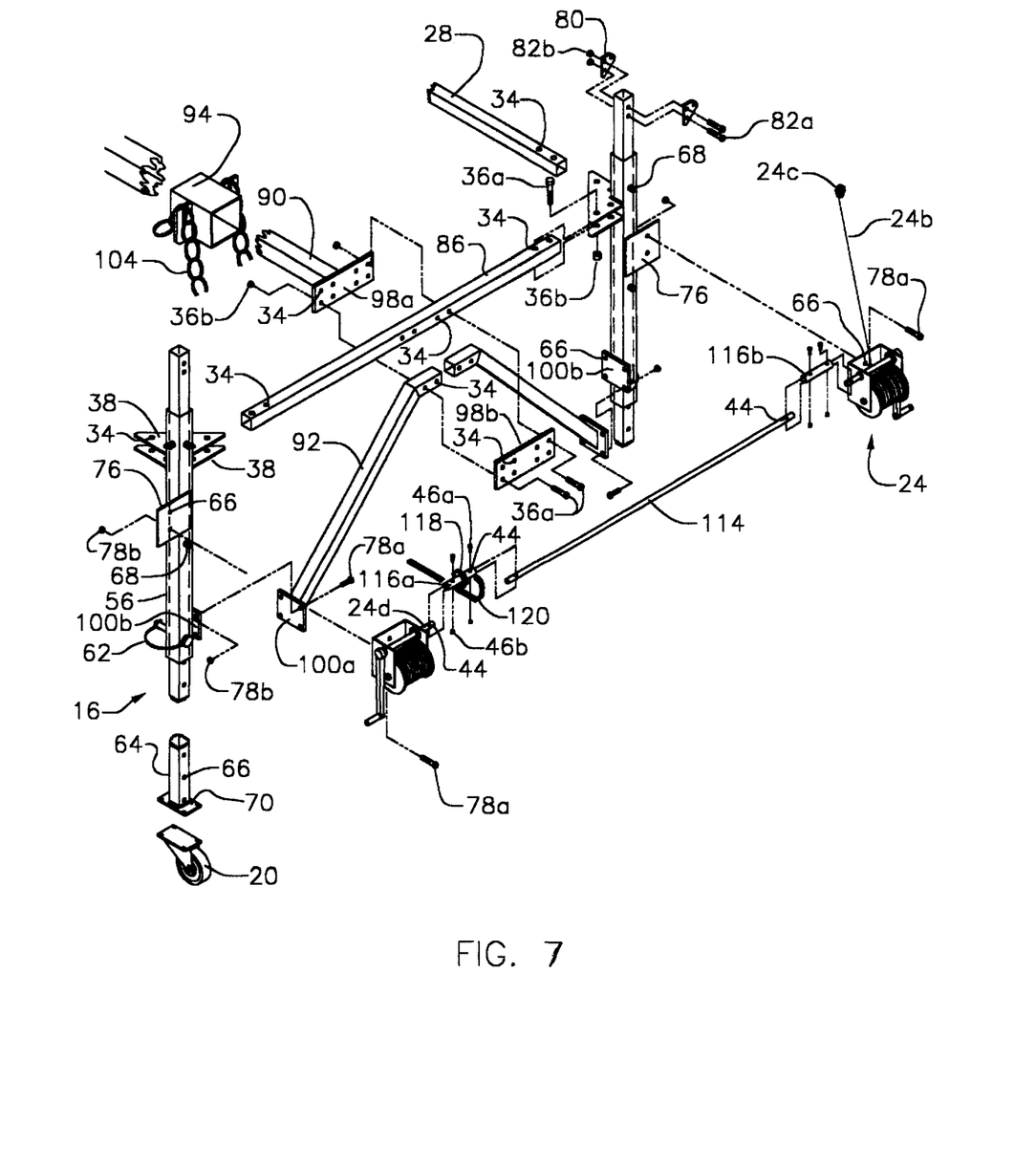
FIG. 7 is an enlarged and exploded sectional view of one of the transverse end assemblies, taken substantially on line 7—7 in FIG. 6, illustrating the added beam and support mountings and the mechanism connecting winches transversely by couplings and a shaft.
Figure 9:
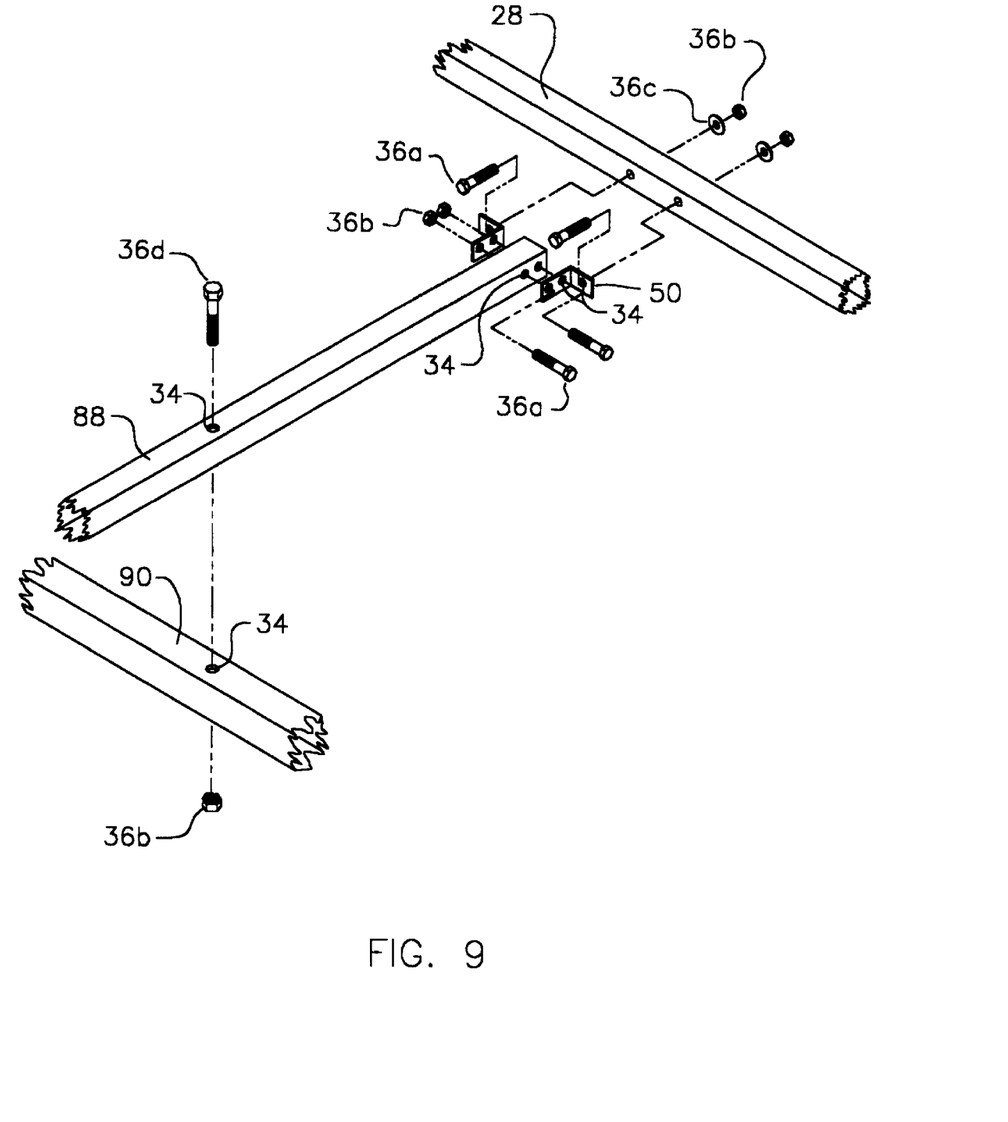
FIG. 9 is an enlarged and exploded sectional view, taken substantially on line 9—9 in FIG. 6, of the crossbar assembly to side member and beam.

Referring to FIG. 6, device 12 comprises a frame 84 supported on a plurality of telescoping legs 16 mounted on locking castors 20 and having attached hand winches 24. Frame 84 is comprised of rigid material, such as square tubing, in the form of two longitudinal side members 28, two transverse end members 86, a plurality of crossbars 88, a beam 90, and a plurality of beam supports 92. End members 86 and 30 and crossbars 88 and 32 for frames 84 and 14 respectively are identical except 34 are added for attaching additional supports as shown in FIGS. 7 and 9. Frame 84 is joined at right angles of its side members 28 and end members 86 by inserting their ends in frame mounts 38 attached to a plurality of telescoping legs 16. Side and end members 28, 86 are secured to frame mounts 38 by aligning apertures 34 and using bolts 36a and nuts 36b as shown in FIG. 7. Crossbars 88 are spaced apart parallel with end members 86 and attached at each end to side members 28 using a pair of angle clips 50 with apertures 34 as shown in FIG. 9 and as described for crossbars 32 in FIG. 4. The clips 50 are first matched to apertures 34 at each end of crossbar 88 and secured together with bolts 36a and nuts 36b. Then clips 50 on crossbar 88 are matched to apertures 34 in side members 28 and secured together with bolts 36a, washers 36c, and nuts 36b. This embodiment does not fix the number of crossbars 88.

Referring to FIGS. 6 and 7, elongated beam 90 has a sliding chain bracket 94, in the form of a hollow tube with opposing hooks for attaching chains 104, slid onto it near each end. Welded, or otherwise attached, to each end of beam 90 is beam mount 98a, one of a pair of beam mounts 98a, 98b, comprised of matching rectangular plates having upper and lower apertures 34. Beam 90 is spaced parallel between side members 28 and mounted centered to end members 86 by matching apertures 34 on upper beam mount 98a, end member 86, and upper beam mount 98b and securing with bolts 36a and nuts 36b. Beam 90 is attached to crossbars 88 by matching apertures 34 and securing with bolts 36d and nuts 36b as shown in FIG. 9. Further bracing and support at each end of frame 84 is provided by beam supports 92 angled diagonally from beam 90 to leg 16. Beam supports 92 are attached using beam mounts 98a, 98b and beam support mounts 100a, 100b, comprised of two matching rectangular plates having apertures 66. As shown in FIG. 7, each diagonal beam support 92 has a short horizontal upper end with apertures 34. Beam support mount 100a is welded, or otherwise attached, to the bottom end of beam support 92. Beam support mount 100b is welded, or otherwise mounted, to the lower section of hollow tube 56 of leg 16. The upper horizontal end of each beam support 92 is attached by butting to the bottom of end member 86 between beam mounts 98a, 98b, matching lower apertures 34, and securing with bolts 36a and nuts 36b. The lower end of beam support 92 is attached to leg 16 by matching apertures 66 on beam support mounts 100a, 100b, and using bolts 78a and nuts 78b.

Telescoping leg 16 is shown in FIGS. 6 and 7 for device 12 with the addition of the above described beam support mount 100b, welded to the lower section of hollow tube 56 of leg 16 for attaching beam supports 92. Telescoping leg 16 is the same as that shown in FIGS. 2 and 3, therefore its description is not repeated here. Refer to FIG. 3 and its description, including castor 20 and winch 24 mounts.

Figure 8:
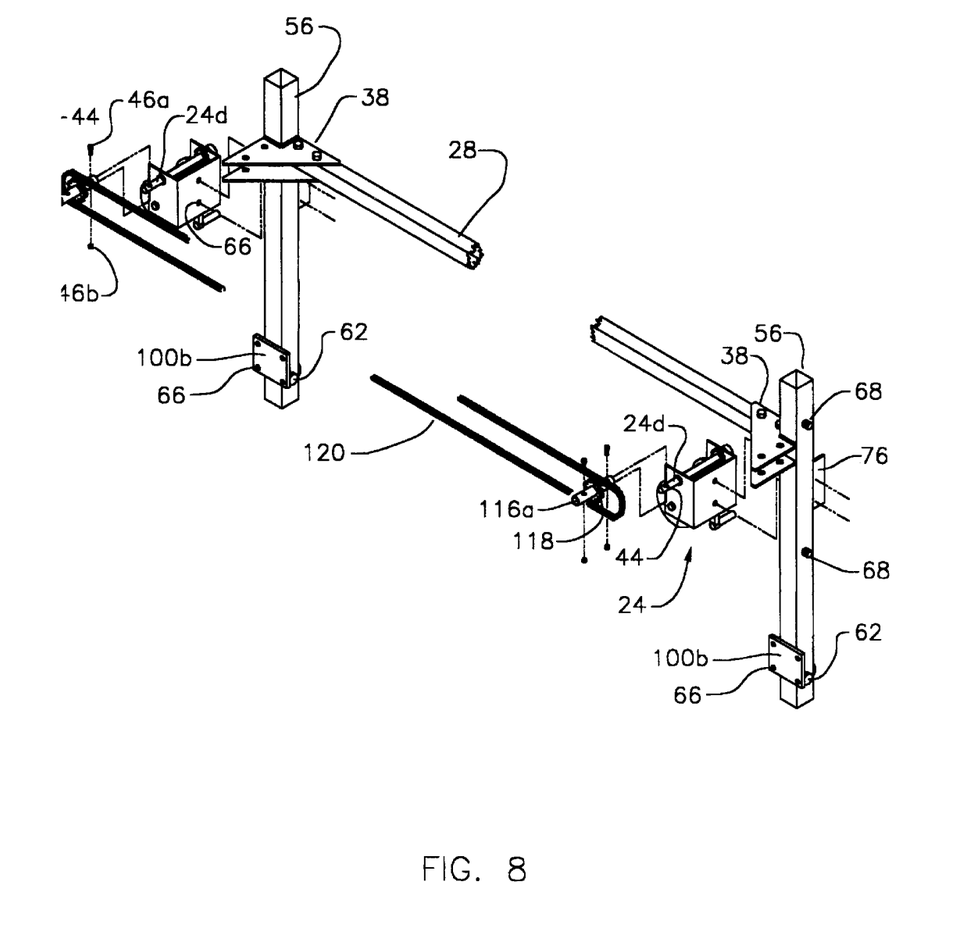
FIG. 8 is an enlarged and exploded sectional view of a longitudinal side assembly, taken substantially on line 8—8 in FIG. 6, showing the mechanism connecting winches longitudinally by a chain mounted on sprockets.

FIGS. 7 and 8 show exploded sectional views of the mechanism for operating the plurality of hand winches 24 from any one winch 24. In FIG. 8, running parallel to one side member 28, each end loop of continuous chain 120 is fitted on chain sprocket 118 welded, or otherwise attached, centered on shaft coupling 116a, comprised of tube material and having apertures 44. With chain 120 now attached to chain sprocket 118, each shaft coupling 116a is fitted over the winch extended drive shaft 24d of each winch 24, located near each end of side member 28, and attached by matching apertures 44, and using bolts 46a and nuts 46b. FIG. 7 shows the coupling of winches 24 parallel to transverse end members 86. Shaft coupling 116b, comprised of tube material and having apertures 44, is fitted over the end of extended drive shaft 24d of the winch 24 not having chain 120 and attached by matching apertures 44, and using bolts 46a and nuts 46b. Shaft 114, an elongated tube or rod having apertures 44, is inserted into the end of shaft couplings 116a and 116b. Matching apertures 44, shaft 114 is secured with bolts 46a and nuts 46b.

For lifting and transporting a load, sliding chain brackets 94 for securing chains 104 are located near each end of beam 90. As an additional safety feature, one end of each chain 104 can be hooked and permanently welded to each chain bracket 94. When device 12 is positioned at a desired height, using winches 24, over the item(s) to be loaded, chains 104 are placed under the item(s) at appropriate load points. Then the ends of chains 104 are secured to chain brackets 94. When the load is properly secured, the height of device 12 is repositioned, using winches 24, for transporting the item(s) to a workstation or other site for intermediate or final disposition. After transporting, the height of device 12 can be adjusted for unloading. Depending upon the work to be performed, a load item might remain on device 12 through one or more workstations to final disposition.

In this alternative embodiment, frame 84 is shown as comprised of fixed length, rigid material for strength and stable load support. Those skilled in the art will recognize frame 84 components, side and end members 28, 86 and crossbars 88, may be modified to allow adjustment of lengths, using methods, such as telescoping.

While the present invention has been described with respect to preferred embodiments, it will be clear to those skilled in the art that modifications and improvements may be made to the invention without departing from the spirit and scope of the invention. Therefore, the invention is not to be limited by the specific illustrative embodiments, but only by the scope of the appended claims.

Advantages

From the description above, one skilled in the art can see many advantages to the present invention described. As illustrated in FIGS. 1A, 1B, 2, and 5, an objective of the present invention to provide means for supporting a variety of load configurations (pipe, lumber, paneling, sheet material, equipment, pickup truck topper or camper shell, etc.) at a selected height relative to a horizontal plane, with locking capabilities, and easily movable with or without a load in place has been met. Likewise, as illustrated in FIG. 6, an objective of the present invention to provide means especially for supporting elongated members loads, such as pipes, beams, rails, and the like has been met. The mobile device of manual transporting serves not only for transport but also for interim storage. It reduces effort and time loading and unloading for transport while providing a stable device of transport for the object of handling. The device is easily assembled and disassembled with common tools. Material and parts used are those readily available in today's market. The device is moved easily into position for loading and unloading. Little or no strain is required by person(s) performing such activity. The device clearly revolutionizes the market need for a new and novel carrier offering a wide range of options for use by individuals, contractors, and businesses throughout the world.

The manner of using the device of manual transporting large objects or loads is the same as for most carriers being loaded and pushed manually to a place of unloading. For all embodiments, height is adjusted using telescoping legs 16 or 18 and/or winches 24.

For the preferred embodiment in FIGS. 1A and 2, height is adjusted and object(s) to be loaded are slid onto frame 14 of device 10 at or near the same level. Attached rollers 42 make the sliding easier. The load may be secured to device 10, if needed. Before transporting, height may be adjusted using winches 24. The load is then transported on device 10, having legs 16 mounted on castors 20 by pushing, pulling, or otherwise maneuvering device 10 to the location where the load is destined for working on, interim storage, or unloading. At the point of unloading, the height may be adjusted for unloading using winches 24 in relation to the level of where the load will be placed. The load is slid off with no lifting or otherwise unloaded.

For the additional embodiment in FIGS. 1B and 5, the operation is the same as for the preferred embodiment.

In the alternative embodiment for moving elongated members in FIG. 6, device 12 is positioned over that to be loaded. The height is adjusted using winches 24 to enable loading and securing the load member(s) using sliding chain brackets 94 and chains 104. After loading and securing the load, the height is adjusted for suspending the load under frame 84 and transfer using winches 24. The load is then transported suspended under frame 84 of device 12, having legs 16 on castors 20, by pushing, pulling, or otherwise maneuvering device 12 with regard to its elongated member (s) load, to the location where the load is destined for working on, interim storage, or unloading. At the point of unloading, the height may be adjusted using winches 24, for positioning device 12 over the place where the load is to be placed. Device 12 is moved into place. Using winches 24, the suspended load may be lowered for removing chains 104 and unloading. Chains 104 are released and removed, thereby unloading the load member(s).

The present invention may be easily disassembled and stored in knockdown form or reassembled in an additional embodiment to achieve a different height range as shown in FIG. 5.

CONCLUSION, RAMIFICATION, AND SCOPE

As can be seen by the reader, the present invention achieves its objects and advantages heretofore described. Those skilled in the art will identify more.

The availability of this new and novel device to owners and marketers of pickup truck toppers will solve a long existing problem in fully using the versatility of pickup trucks. The ability to load and unload many objects by one person that formerly took at least two will enable individuals and businesses to function independently. The improved safety and productivity in construction environments as related to moving and handling elongated items will shorten construction time and reduce costs.

Although the description above contains many specifics, these should not be construed as limiting the scope of the invention but as merely providing illustrations of some of the embodiments of this invention. Thus the scope of the present invention should be determined by the appended claims and their legal equivalents, rather than the examples given.

We claim:

1. A device for handling an object comprising:

(a) a load bearing base frame having a pair of elongated longitudinal side members, a pair of elongated transverse end members attached to the longitudinal side members, and a plurality of crossbars spaced equidistant apart, parallel to said end members and attached at each end to said side members using angle clips, each of said plurality of crossbars supporting a conveying means;

(b) a plurality of elongated support legs of equal length, each leg having telescoping means mounted thereon for vertical adjustment therealong and locking means for fixing said telescoping means in position, the telescoping means each being secured to the base frame;

(c) winch and cable means mounted on the telescoping means and the support legs for producing a vertical adjustment of the telescoping means and load bearing frame along the support legs, said frame being supported in a horizontal plane between at least an upper position on the legs and a lower position on the legs for transporting the object thereby providing at least two ranges of height adjustment;

(d) wheel means for the pivotal positioning of said device for loading and for rolling said device upon a surface from place to place, said wheel means being mounted at a bottom end of each said support legs, whereby a person(s) can roll said device to a location of the object to be offloaded, adjust the height of said frame to a level of the object to be offloaded by using the telescoping means and locking means on said support legs, move one end of said device next to a medium supporting the object to be offloaded, offload the object by conveying the object from the medium onto said frame of said device and transport the object on said device by rolling said device to a next location for any desired operation thereat.

2. The device of claim 1, wherein said conveying means includes rollers having attachment means mounted on top of said end members and said crossbars of said frame, whereby said rollers will facilitate the handling of the objects.

3. The device of claim 1, wherein a load attachment means is provided for lifting, supporting and transporting a load, said load attachment means being suspendedly mounted on beam support means attached to the paired elongate transverse end members and said plurality of crossbars.

* * * * *